United States Patent
Price et al.

(10) Patent No.: US 11,449,350 B2
(45) Date of Patent: Sep. 20, 2022

(54) SYSTEMS AND METHODS FOR AUTOMATICALLY UPDATING COMPUTE RESOURCES

(71) Applicants: Atlassian Pty Ltd., Sydney (AU); Atlassian Inc., San Francisco, CA (US)

(72) Inventors: Alexander William Price, Sydney (AU); Jacob Christopher Joseph Gonzalez, Sydney (AU); Matthew Neil Whittington, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 258 days.

(21) Appl. No.: 16/912,881

(22) Filed: Jun. 26, 2020

(65) Prior Publication Data

US 2021/0406035 A1    Dec. 30, 2021

(51) Int. Cl.
*G06F 9/44* (2018.01)
*G06F 9/448* (2018.01)
*G06F 9/4401* (2018.01)
*G06F 15/173* (2006.01)
*G06F 8/65* (2018.01)
*G06F 11/30* (2006.01)
*G06F 9/445* (2018.01)

(52) U.S. Cl.
CPC ............ *G06F 9/4498* (2018.02); *G06F 8/65* (2013.01); *G06F 9/4403* (2013.01); *G06F 9/44505* (2013.01); *G06F 11/3006* (2013.01); *G06F 15/17306* (2013.01)

(58) Field of Classification Search
CPC ........ G06F 9/4498; G06F 8/65; G06F 9/4403; G06F 9/44505; G06F 11/3006; G06F 15/17306
See application file for complete search history.

(56) References Cited

U.S. PATENT DOCUMENTS

| | | | |
|---|---|---|---|
| 6,826,624 B1* | 11/2004 | Fell, Jr. ............. | H04L 29/12594 707/E17.115 |
| 10,021,179 B1* | 7/2018 | Velummylum .......... | G06F 16/14 |
| 10,320,841 B1* | 6/2019 | Allen ..................... | G06N 20/00 |
| 11,290,486 B1* | 3/2022 | Allen .................. | H04L 63/1416 |
| 2018/0067736 A1* | 3/2018 | De Zaeytijd ............. | G06F 8/65 |
| 2018/0262529 A1* | 9/2018 | Allen ..................... | G06F 21/566 |
| 2019/0245680 A1* | 8/2019 | Boutaba .................. | G06F 21/64 |
| 2021/0256310 A1* | 8/2021 | Roberts .................. | G06N 20/00 |

\* cited by examiner

*Primary Examiner* — Zahid Choudhury
(74) *Attorney, Agent, or Firm* — Brownstein Hyatt Farber Schreck, LLP

(57) ABSTRACT

Systems and methods for automatically removing and replacing outdated compute resources in a cluster. The systems and methods include a configurable monitoring system that is configured to detect outdated compute resources and trigger a cycling process to automatically replace the detected outdated compute resources with new compute resources. The disclosed systems and methods safely rotate a group of compute resources by identifying and detaching outdated compute resources, waiting until the outdated compute resources have been drained of pending jobs scheduled on these resources, waiting until replacement compute resources have started and then cordoning, draining, deleting and terminating the outdated compute resources.

20 Claims, 7 Drawing Sheets

SYSTEMS AND METHODS FOR AUTOMATICALLY UPDATING COMPUTE RESOURCES

TECHNICAL FIELD

Aspects of the present disclosure are directed to systems and methods for automatically updating compute resources in a cluster/compute group.

BACKGROUND

In general, software programs and applications may be adapted to run on a variety of platforms that require compute resources. As described herein, the compute resources may be updated over time, which may result in a combination of new and outdated or redundant compute resources. The systems and techniques described herein may be used to automatically update compute resources in order to achieve improved computer efficiency and performance.

SUMMARY

Example embodiments are generally directed to a computer-implemented method for automatically cycling outdated compute nodes in a compute group maintained by an orchestration system in communication with a resource provider. The method may include detecting a new cycle node request (CNR) object in the compute group, the CNR object including identifiers of one or more outdated compute nodes and an identifier of a method for deleting the one or more outdated compute nodes. The method may also include causing the resource provider to add one or more new compute resources to a resource group maintained by the resource provider that corresponds to the compute group maintained by the orchestration system. The method may also include causing the orchestration system to cordon the one or more outdated compute nodes and generating a cycle node status (CNS) object for each of the one or more outdated compute nodes, each CNS object including an identifier of a corresponding outdated compute node and the identifier of the method for deleting the outdated compute node. the method may also include, for each CNS object: deleting the corresponding outdated compute node based on the method for deleting the outdated compute node specified in the CNS object, causing the resource provider to terminate a corresponding compute resource in the corresponding resource group; and updating a state of the CNS object to successful upon successfully causing the resource provider to terminate the corresponding compute resource. The method may also include: monitoring the state of the CNS objects, and ending the method for automatically cycling the outdated compute nodes upon determining that the state of each of the CNS objects is successful.

Some example embodiments are directed to a system for automatically cycling outdated compute nodes in a compute group maintained by an orchestration system in communication with a resource provider. The system may include a cycling manager configured to: detect a new cycle node request (CNR) object in the compute group, the CNR object including identifiers of one or more outdated compute nodes and an identifier of a method for deleting the one or more outdated compute nodes, and initialize a state machine based on the CNR object. The state machine may be configured to: cause the resource provider to add one or more new compute resources to a resource group maintained by the resource provider that corresponds to the compute group maintained by the orchestration system; cause the orchestration system to cordon the one or more outdated compute nodes; generate a cycle node status (CNS) object for each of the one or more outdated compute nodes, each CNS object including an identifier of a corresponding outdated compute node and an identifier of a method for deleting the outdated compute node; and initialize a child state machine for each of the CNS objects. Each child state machine may be configured to: perform the method for deleting the outdated compute node specified in the CNS object, and cause the resource provider to terminate a corresponding compute resource in the corresponding resource group. The system may also be configured to update a state of the CNS object to successful; monitor the state of the CNS objects; and upon determining that the state of each of the CNS objects is successful, ending the state machine.

Figure 1:
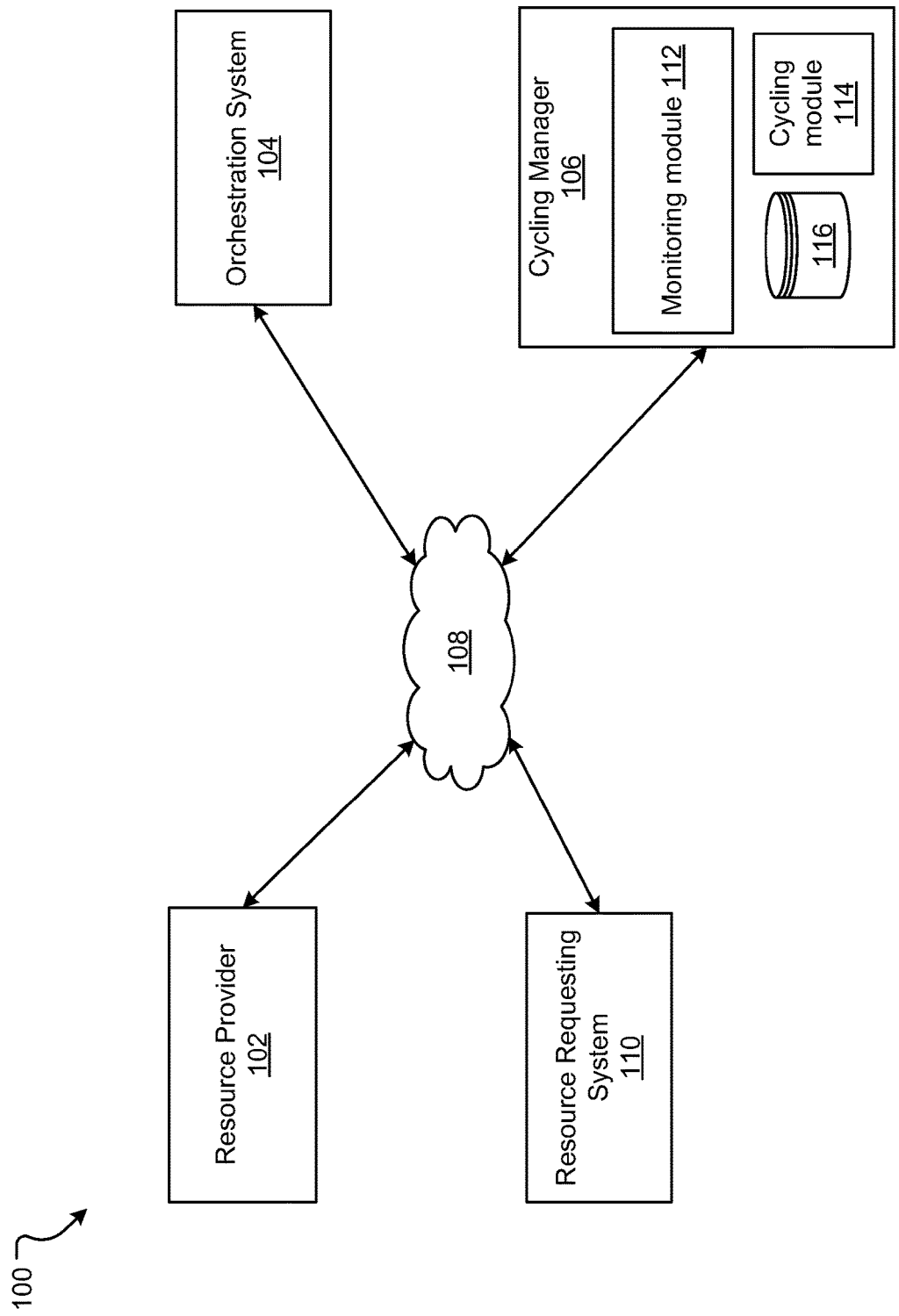
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

For purposes of the following discussion, container-based virtualization may refer to software applications/programs that are executed within 'containers'. A container includes not only the application that needs to be executed but everything needed to run the application including runtime, system libraries, system tools, and settings. Accordingly, a container can be considered a deployable unit of software that packages up code and its dependencies so that an application can run quickly and reliably from one computing environment to another. Typically, in container-based virtualization, multiple containers share the hardware resources of a single operating system.

To manage the creation, destruction, deployment and scaling of containers, a number of container orchestration systems can be used. These include, e.g., Kubernetes, Docker Swarm, Nomad, etc. Some container orchestration systems may provide auto-scaling capabilities that may be responsive to available compute resources. However, oftentimes, compute resources need to be updated. For instance, the operating systems, software applications and/or data on the compute resources may need to be updated or upgraded, a software bug (an error in the software) may need to be rectified, a security vulnerability (that may be exploited by a hacker or malicious software) may have to be addressed, or performance enhancements need to be made. In such scenarios, an updated compute resource configuration may be provided to the container orchestration system to use when spinning up new compute resources. Over time, as demand increases, the orchestration system may add new compute resources based on the updated compute resource configuration. However, the configuration of older compute resources (e.g., compute resources that were running before the updated configuration was available) is not updated. In such cases, over time, a cluster of compute resources may include some compute resources that are created based on the new configuration and some outdated compute resources that were created based on the old configuration.

This may cause performance issues when implemented at a large enough scale. The older/outdated compute resources may still face the issues that were fixed by the update and customers may experience varied performance—depending on which compute resource their application was executed on. To prevent such issues, when an updated configuration is created, the outdated compute resources should be updated and/or replaced by new compute resources.

To address the problem introduced by updating compute resources, a system may systematically update the compute resources in a cluster that have the outdated configuration or replace such compute resources. However, systematic updating the configuration of active compute resources typically involves a long downtime, which impacts users of the compute resources and/or tasks being performed thereon and therefore this is not a preferred solution.

Systematically replacing, for example, ten old compute resources in a cluster typically involves creating ten new compute resources in the cluster, marking the old compute resources such that no new tasks are assigned to them, and then draining the work load off the old compute resource, and placing it on the new compute resources, and then deleting the old compute resources. This is a lengthy process which may be feasible when dealing with a small number of compute resources in a single cluster and/or where compute resources are updated rarely. But, this process becomes untenable when it needs to be performed on hundreds of clusters having thousands of active compute resources at any given time that are frequently updated. Further, such processes require doubling of compute resources before the old compute resources can be deleted. Again, this might not be considered a major increase in utilization of compute resources for small clusters, but can become considerable for larger clusters. Finally, such conventional processes require system administrators to continuously keep track of compute resources, their configurations, and their current state. This not be feasible in situations where an organization manages hundreds if not thousands of active compute resources in multiple clusters and/or in situations where the configuration of compute resources is often updated.

To address one of more of these issues, embodiments of the present disclosure introduce a new method and system to automatically remove and replace outdated compute resources in a cluster. The presently disclosed systems and methods include a configurable monitoring system that is configured to detect outdated compute resources and trigger a cycling process to automatically replace the detected outdated compute resources with new compute resources.

In particular, the disclosed systems and methods safely rotate a group of compute resources by identifying and detaching outdated compute resources, waiting until the outdated compute resources have been drained of pending jobs scheduled on these resources, waiting until replacement compute resources have started and then cordoning, draining, deleting and terminating the outdated compute resources.

Further, a user can configure the cycling system to remove and replace compute resources in a given cluster based on one or more predetermined cycling patterns. For instance, users can configure the recycling system to remove and replace compute resources serially—i.e., one at a time. In this case, the cycling system creates a new compute resource for one compute resource at one time. Once that compute resource is replaced and deleted, the next compute resource may be updated. Using this approach, at any given time one additional compute resource is created in a cluster, which is often less disruptive to the functioning of a cluster and safer.

Alternatively, the cycling system may be configured to remove and replace two or more compute resources simultaneously and asynchronously. That is, although a number of cycling processes may commence simultaneously, they may complete at different times and independently of each other.

In some embodiments, the cycling system is programmed as a finite state machine—i.e., an abstract machine that can be in one state of a finite number of states at any given time and that transitions from one state to another based on certain conditions being met. At execution time, when the monitoring system detects one or more outdated compute resources, the monitoring system can trigger execution of the finite state machine. This finite state machine can then spawn one or more child state machines for cycling individual compute resources based on the selected cycling pattern. The advantages of a state machine are mainly, but not limited to: precise and deterministic control of each step of the process, compartmentalized process components and responsibilities, increased safety of actions, more straightforward reconciliation and transition from errors, and control of process order. For example if an unexpected error occurs in one of the later states, it is easy to determine where and how the error occurred and to rest assured that the processes that needed to be performed in the previous states have successfully been performed. Further, having the two state machines—the parent and children machines, allows for parallel processing and cycling multiple nodes at once, where the child state machines have discrete ownership of a node's lifecycle.

Further, if the cycling system detects any errors or failures while removing and replacing the outdated compute nodes it can stop the cycling process and generate an alert. This alert can be forwarded to an operator. Once the error or failure is fixed, the cycling process can be resumed from the state where the error was detected instead of commencing again from the start.

In the present disclosure, aspects of the automatic cycling systems and methods will be described in the context of container-based virtualization. However, it will be appreciated that this is merely an example application of the disclosed automatic cycling systems and methods, which can also be utilized in traditional hypervisor based virtualization or with any platform or system that offers groups or clusters of compute resources.

These and other aspects of the present disclosure will be described in detail with reference to FIGS. 1-7 below.

FIG. 1 illustrates an environment 100 in which one or more aspects of the present disclosure are implemented. Specifically, FIG. 1 illustrates the systems involved in automatically cycling compute resources—i.e., removing outdated compute resources and replacing these with new compute resources. As used herein, compute resources refer to physical or virtual machines that are allocated predetermined units of CPU and memory.

The systems in environment 100 include a resource provider 102, an orchestration system 104, and a cycling manager 106. The resource provider 102, orchestration system 104 and cycling manager 106 communicate with each other over one or more communication networks 108. In addition to these core elements, the environment 100 further includes one or more resource requesting systems 110. The following section describes these systems and then proceeds to describe how they interact with each other.

The resource provider 102 provides infrastructure (i.e., the compute resources) for executing scheduled jobs. The infrastructure may be provided via one or more on-premises data centers or one or more remote data centers hosted by a cloud service provider such as Amazon Web Services (AWS). Further, the resource provider 102 may assign infrastructure in the form of physical machines or virtual machines. In any case, a resource requesting system 110 may communicate with the resource provider 102 and request the resource provider to assign certain resources (e.g., CPU and memory) to the resource requesting system 110. The resource provider 102 in turn may then determine the number of physical and/or virtual machines that would be required to fulfil the desired CPU and memory requirements and assign these physical or virtual machines to the resource requesting system 110. The collection of compute resources assigned to the resource requesting system 110 at any given time is called a compute group. In some embodiments, multiple compute groups may be assigned to a resource requesting system 110.

The resource provider 102 is also configured to increase or decrease the compute resources assigned in a compute group. In certain cases, the resource provider 102 may be configured to automatically scale the compute resources in the compute group based on monitored demand. In other cases, the resource provider 102 may be configured to scale-up or scale-down the assigned number of assigned physical/virtual machines based on external instructions.

In order to scale-up or scale-down either automatically or based on external instructions, the resource requesting system 110 provides a launch configuration to the resource provider 102. This launch configuration includes the hardware and resource configuration that is used to create new compute resources for scaling up a compute group. Typically, a compute group is associated with one launch configuration at a time. To change the launch configuration for a compute group a new launch configuration is created and then, the compute group is updated to use the new launch configuration.

After the launch configuration is changed for a compute group, any new compute resources added to the compute group are launched using the new configuration options, but existing compute resources are not affected. Accordingly, any change in the launch configuration causes compute resources that were added to the compute group before the change to become "outdated compute resources". The cycling manager 106 of the present disclosure can cause the resource provider 102 to remove such outdated compute resources and replace these with compute resources that are launched based on the new launch configuration.

The orchestration system 104 is configured to automate the assignment and management of scheduled jobs. In particular, it is configured to assign jobs to the physical/virtual machines provided by the resource provider 102. To this end, the orchestration system 104 determines the virtual/physical machines assigned to a particular resource requesting system 110 and automatically assigns a scheduled job from the resource requesting system 110 to a virtual/physical machine assigned to that resource requesting system 110 or compute group. In addition, the orchestration system 104 is configured to manage job deployments and scale the underlying compute group based on demand.

In container-based virtualization, the orchestration system 104 is configured to receive job descriptors from the resource requesting system 110, create containers based on the received job descriptors and launch these containers on the physical/virtual machines in a compute group. Typically, the orchestration system 104 launches containers on the underlying machines in a manner that distributes the load evenly among the active machines. Examples of orchestration systems include Kubernetes, Docker Swarm, Titus, Nomad, etc.

For a particular resource requesting system 110, the cycling manager 106 is configured to remove and replace outdated compute resources in the compute group. In particular, the cycling manager 106 is configured to monitor the compute resources in a given compute group and determine whether any outdated compute resources exist in the compute group. If any outdated compute resources are identified, the cycling manager 106 is configured to initiate a cycling process that automatically removes and replaces the identified outdated compute resources in a safe manner and by causing minimum disruption to the ongoing jobs being handled by the outdated compute resources and the compute group in general. To do this, the cycling manager 106 includes a monitoring module 112 and a cycling module 114. Further, the cycling manager 106 maintains a database 116 for recording status of compute resources in a compute group during the cycling process.

During a cycling process, the cycling manager 106 is also configured to instruct the resource provider 102 to assign new compute resources to the compute group to replace existing compute resources and instruct the resource provider 102 to terminate the outdated compute resources once they are replaced.

In certain embodiments, if an identified outdated compute resource has active queued jobs, the cycling manager 106 marks the identified one or more outdated physical/virtual machines such that the orchestration system 104 cannot assign any new containers to the marked physical/virtual machines. These machines remain marked for a certain period of time. For example, until the jobs queued on these machines are completed. Once the queued jobs are completed, the cycling manager 106 requests the resource provider 102 to terminate the marked physical/virtual machines.

Accordingly, the cycling manager 106 communicates with the orchestration system 104 to collect information about active compute resources and their configuration and communicates with the resource provider 102 to instruct the resource provider to create new compute resources or delete outdated compute resources.

The resource requesting system 110 can be any system that creates and/or manages jobs (e.g., synthetic tests, builds, deployments, etc.). The resource requesting system 110 communicates with the resource provider 102 to provision infrastructure and communicates with the orchestration system 104 to provision one or more containers for executing the jobs on the provisioned infrastructure.

In one example, the resource requesting system 110 may be a continuous integration/continuous deployment (CI/CD) tool such as Bitbucket Pipelines (offered by Atlassian, Inc.) that is configured to manage builds. The CI/CD tool detects whether source code in a repository that is registered for continuous integration is updated, retrieves a build description associated with that source code from the repository, and creates a job description for initializing one or more containers to test and/or build the source code based on the build description. Along with other factors, the job description typically specifies an allocation of resources to complete the job. In certain embodiments, if the allocation of resources is not specified, a default amount of memory and CPU may be allocated to the job request. The orchestration system 104 utilizes this specified resource allocation to determine which underlying machine to allocate the job to.

In another example, the resource requesting system 110 may be a test management system that manages synthetic tests (e.g., Pollinator offered by Atlassian, Inc.). The test management system is typically responsible for receiving test requests from client devices, scheduling synthetic tests based on test parameters included in the requests, and communicating descriptors of scheduled tests to the orchestration system 104. The test descriptors specify an allocation of resources to complete the test. The orchestration system 104 can then utilize the specified resource allocation to determine which underlying machine to allocate the tests to.

As illustrated in FIG. 1, communications between the various systems are via the communications network 108. The communication network 108 is depicted as a single network in FIG. 1 for ease of depiction. However, in actual implementation, the various systems illustrated in FIG. 1 may communicate with each other over different communication networks. For example, the orchestration system 104 and the resource provider 102 may communicate through one communication network whereas the cycling manager 106 and the orchestration system 104 may communicate over a different communication network. Similarly, the resource requesting systems 110 may communicate with the orchestration system 104 via a local network and with the resource provider 102 via a public network without departing from the scope of the present disclosure. Furthermore, the systems may communicate with each other over open web protocols such as Hypertext Transfer Protocol Secure (HTTPS), REpresentational State Transfer (REST), and JSON Web Token (JWT).

Some of the implementation details of the automatic cycling systems and methods of the present disclosure will be described with respect to a Kubernetes orchestration system 104. It will be appreciated that Kubernetes is merely used as an example to illustrate the automatic cycling methods described herein are the systems and methods are not limited to operating with Kubernetes but can operate with other orchestration systems as well.

Figure 2:
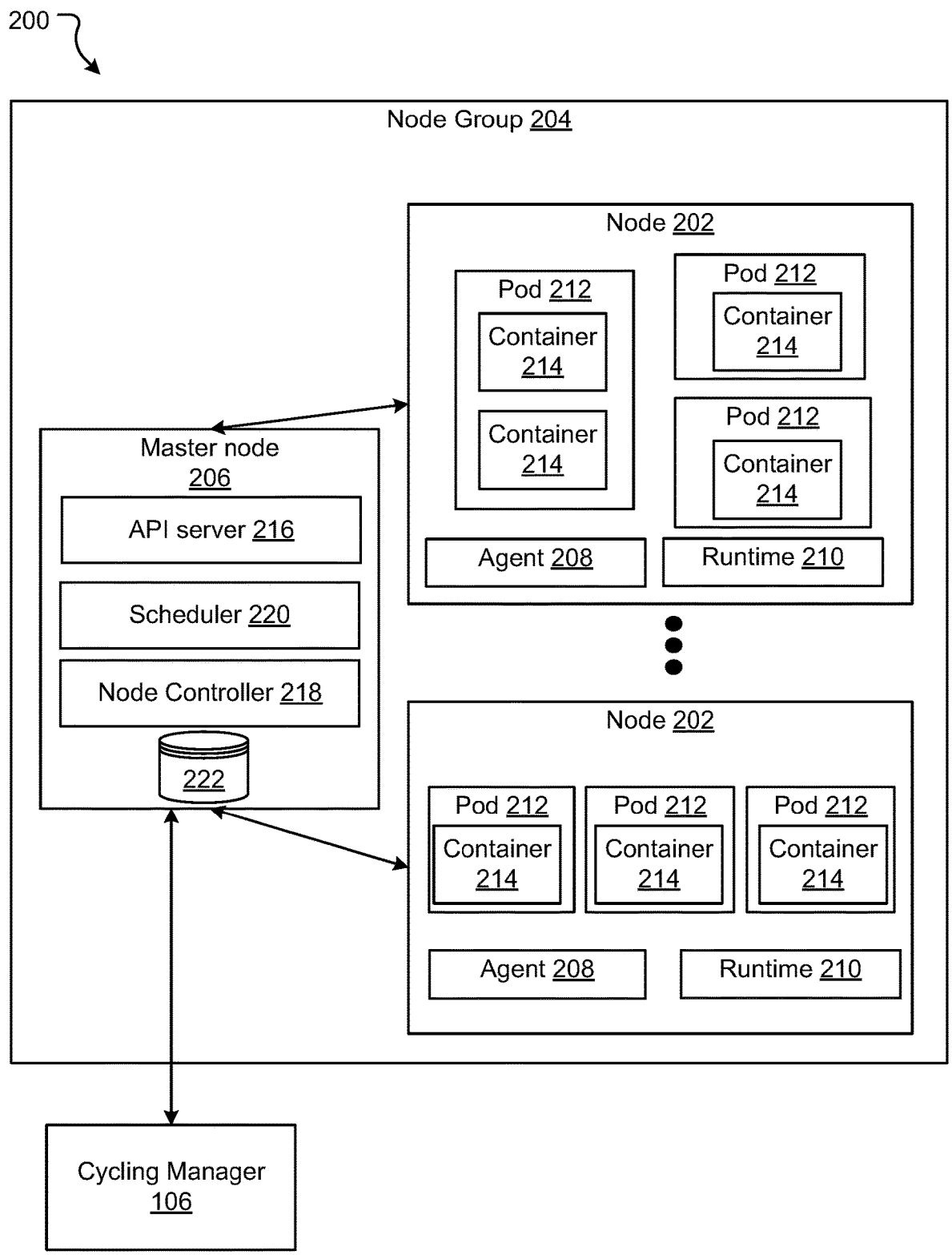
FIG. 2 is a block diagram of an example orchestration system in communication with the cycling manager.
Figure 3:
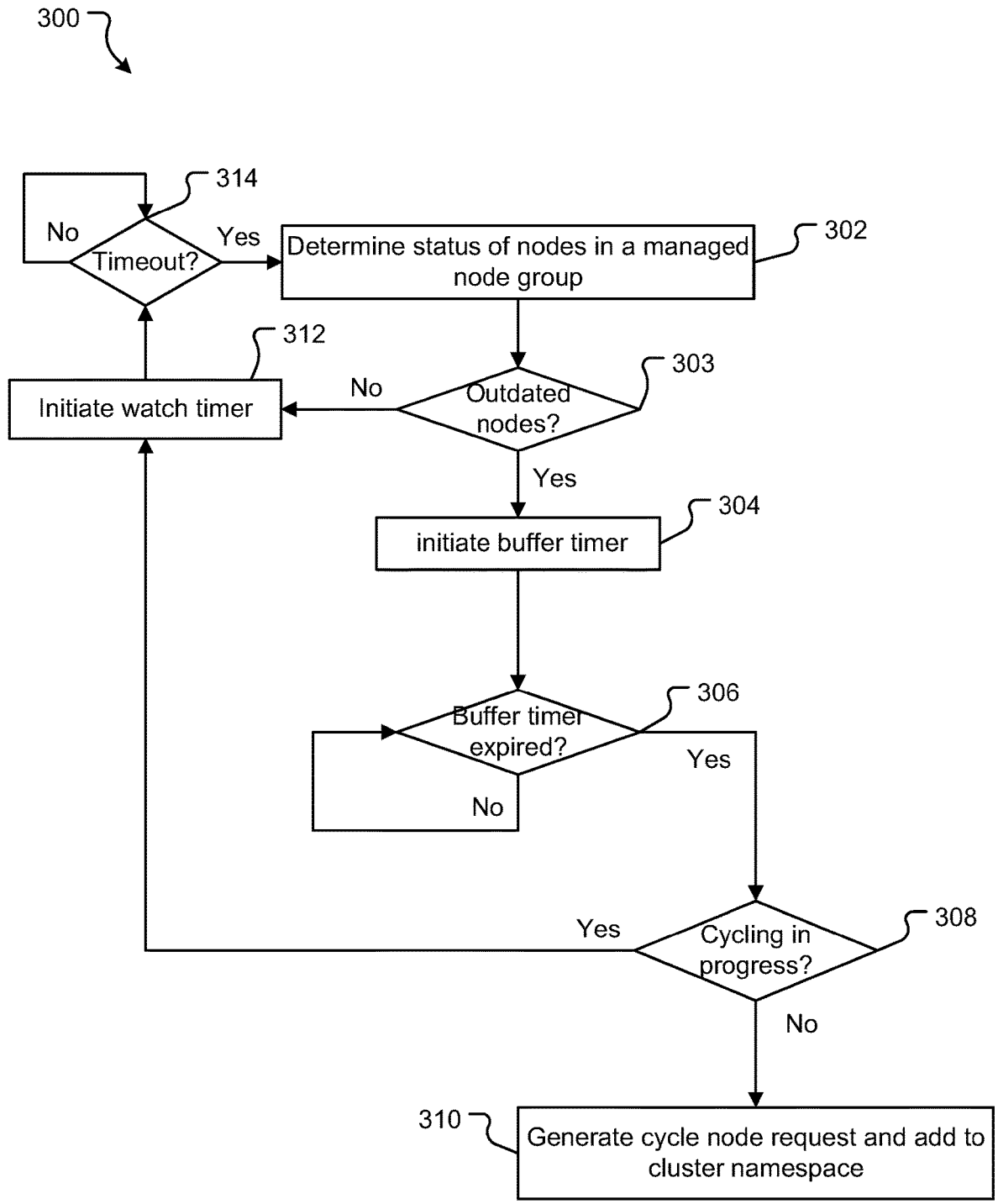
FIG. 3 is a flowchart illustrating an example method for initiating a cycling process according to some embodiments of the present disclosure.

FIG. 2 illustrates a Kubernetes architecture 200. In Kubernetes, an underlying compute resource (i.e., a physical or virtual machine) is called a node 202. A cluster of such worker machines that are assigned to the same compute group is called a node group 204. It will be appreciated that a node group is an abstracted version of a compute group. Different resource requesting systems 110 may be assigned different node groups. However, each node 202 in a particular node group 204 directly correlates with a corresponding compute resource assigned to the resource requesting system 110 by the resource provider 102 and in this disclosure the terms node and compute resource may be interchangeably used. Further, each node 202 in the node group 204 contains the services for running containers and is managed by a common master node 206.

The master node 206 makes global decisions about the node group 204, e.g., scheduling, as well as detecting and responding to events in the node group 204. The master node 206 includes an application programming interface (API) server 216 that exposes the Kubernetes API and is a frontend of the master node 206. External applications and users can interact with the node group 204 via the API server 216—e.g., to perform function and retrieve the status of the objects in the node group. In addition, the master node 206 includes a node controller 218, which typically manages a list of the nodes 202 in the node group 204 and synchronizes this list with the resource provider's list of machines assigned to that particular resource requesting system 110. The node controller 218 may also be configured to communicate with the resource provider 102 from time to time to determine if an underlying machine is still available or not. If an underlying machine is not available, the controller 218 is configured to delete the corresponding node 202 from its list of nodes. In this manner, the node controller 218 is aware of the infrastructure assigned to the node group by the resource provider 102.

Further, the master node 206 includes a scheduler 220 that assigns jobs to active nodes. And a database 222 that stores the configuration and state of the node group. The API server 216 queries this database to retrieve information.

In some embodiments, the master node 206 includes another controller commonly referred to as a DaemonSet controller (not shown). This controller ensures that all or some of the nodes in a node group run a copy of a DaemonSet pod. As nodes 202 are added to the node group 204, DaemonSet pods are added to them. As nodes 202 are removed from the node group, those pods are deleted. The DaemonSet pod on each node can be programmed to perform a number of functions such as collecting logs or monitoring the operation of the corresponding node and forwarding this back to the API server 216, which saves the logs in the database 222.

Typically, the DaemonSet controller is configured based on a configuration template. If that configuration template is updated, in some cases, the master node 206 creates new DaemonSet pods on existing nodes once the outdated DaemonSet pods are manually deleted. In such cases, any newly created nodes however will be created based on the updated DaemonSet configuration template. Accordingly, any change in the DaemonSet configuration template causes the nodes that were created before the change to become "outdated nodes". According to some aspects of the present disclosure, the cycling manager 106 is configured to automatically delete such outdated nodes with the outdated DaemonSet pods running and replace these outdated nodes with new nodes containing DaemonSet pods created based on the updated configuration template.

Each worker node (referred to as a node 202 herein) includes an agent 208 that is configured to ensure that containers are running within the node and a runtime 210 that is responsible for running the containers. With the help of the agent 208 and runtime 210, one or more pods 212 may be launched on the active nodes 202 in a node group 204. A pod 212 is the basic building block of Kubernetes. A pod 212 encapsulates one or more containers 214, storage resources (not shown), and options that govern how the containers 214 run.

Typically, the API server 216 can query the agent 208 running on the nodes 202 in the node group 204 to retrieve information about the nodes including information about the pods running on the node, the state/condition of the pods, the available resources on the node: the CPU, memory, and the maximum number of pods 212 that can be scheduled onto the node 202 at any given time. Further, the agent 208 can inform the API server 216 of the job requests scheduled for execution on the pods 212. The API server 216 stores this information in the database 222.

In some embodiments, the cycling manager 106 may be executed within a container inside the node group 204. In other implementations, the cycling manager 106 may be executed in a container outside the node group 204. In any event, the cycling manager 106 can communicate with the master node 206 (and specifically with the API server 216) via an API interface to obtain information about the nodes and the pods in the node group 204 from time to time. For instance, the cycling manager 106 can request the API server 216 to provide a list of nodes and active pods in the node group 204. To provide the current status of a particular node, and/or the status of a particular pod. Similarly, the cycling manager 106 may setup one or more "watches", for example, to receive updates whenever nodes and/or pods are created, deleted, drained, etc. in the node group. When a watch is setup, the API server 216 communicates the requested information to the cycling manager 106 in real time.

Kubernetes provides a custom resource definition (CRD) feature which enables users to add custom objects to a Kubernetes node group and use it like any other native Kubernetes object (such as node, pod, DaemonSet, etc.). In some embodiments, the cycling manager 106 introduces three new objects via the CRD to perform the cycling process. These include, a node group object, a cycle node request (CNR) object, and a cycle node status (CNS) object.

The node group object acts as a template for CNR objects. It describes a group of nodes and how to cycle these nodes. The monitoring module 112 utilizes this node group object to generate CNR objects.

The node group object includes, for example, the name of the node group to be managed by the cycling manager 106 and a method for deleting pods—draining or waiting. In the draining method, the orchestration system 104 evicts the pods in a node (allowing them to gracefully terminate the current tasks they are performing). The wait method allows pods on a node to complete their tasks and naturally be removed from the node. The wait method is generally useful in situations where the resource requesting system 110 does not wish to forcefully remove pods, such as pods used for high churn jobs, which need to be run to completion. The node group object may also specify the maximum concurrency for cycling nodes—i.e., the maximum number of nodes the cycling manager 106 can concurrently update in a given cycling process. This node group object may be installed in a Kubernetes node group and saved in the database 222.

Table A illustrates an example node group object specification.

TABLE A

Example node group object specification

```
apiVersion: atlassian.com/v1
kind: NodeGroup
metadata:
    name: system
nodeGroupName: "example.my-nodes.my-site.com"
nodeSelector:
    matchLabels:
        role: system
        customer: example
        network: private
cycleSettings:
    method: Drain
    concurrency: 1
```

The CNR object handles a request to cycle outdated nodes belonging to a specific node group 204. It is generated by the monitoring module 112 when it detects outdated nodes in a particular node group it is managing. In certain embodiments, the monitoring module 112 generates this CNR object based on the node group object installed in the corresponding node group 204. In particular, it utilizes the node group object as a template to generate a CNR object. Accordingly, the CNR object typically includes the same parameters and fields as the node group object, including, for example, the node group name, the method for deleting pods, and the maximum cycling concurrency. Table B illustrates an example CNR specification.

TABLE B

Example CNR specification

```
kind: "CycleNodeRequest"
metadata:
    name: "example"
    labels:
        name: "example"
spec:
nodeGroupName: "<fully_qualified_node_group_name>"
selector:
        matchLabels:
            labelKeyA: valueA
            labelKeyB: valueB
nodeNames:
        - "node-name-A"
        - "node-name-B"
    cycleNodeSettings:
            method: "Wait|Drain"
concurrency: 5
labelsToRemove:
        - <labelKey>
            ignorePodsLabels:
                labelName:
                - "value1"
                - "value2"
            ignoreNamespaces:
            - "kube-system"
```

In this example CNR specification— nodeGroupName—indicates the name of the node group in the resource provider.

selector—is a Kubernetes style selector, which is used to select the nodes in the node group that need to be cycled.

matchLables—is used to cycle specific nodes out of the node group. At runtime, the nodes that have labels matching those provided in the field will be cycled, whereas the remaining nodes may remain unchanged.

nodeNames—is used to cycle specific node names out of the group, ignoring other nodes that are in the group. This is an optional field. If it is not provided, all the nodes in the group are cycled.

method indicates the method for deleting pods, can be "Wait" or "Drain" and defaults to "Drain" if this field is not provided.

concurrency is an optional field that indicates the number of nodes to simultaneously cycle. The default is the current number of nodes in the node group labelsToRemove is an optional field used to remove a list of labels from pods before draining. This field is useful if labels need to be removed from existing services before draining the nodes to prevent requests being sent to the pod from being interrupted when the pods are terminated. In one example, a Domain Name System (DNS) label may be applied to pods for executing DNS tasks. In such cases, the DNS label may be added to the labelsToRemove in the CNR specification so that when the pod and node is drained the DNS label is removed first, thus excluding the pod from serving any further DNS requests.

ignorePodsLabels is an optional field that can be used if the deleting method is "wait". This field indicates a map of label names to a list of label values, where any value for the given label name will cause a pod to not be waited for. In this example CNR, the pods that have labels where labelName=value1 or labelName=value2 are ignored during the "wait" method.

ignoreNamespaces is also an optional field that can be used if the deleting method is "wait". This field includes a list of namespaces from which to ignore pods when waiting for pods on a node to finish executing. In this example, the namespace is "kube-system".

The cycle node status (CNS) object handles the draining of pods from, and termination of, an individual outdated node. The CNS object is generated by the cycling module 114 during a cycling process. Table C illustrates an example CNS specification.

TABLE C

Example CNS specification

```
kind: CycleNodeStatus
metadata:
    name: example-<node name>
    labels:
        name: example
spec:
    cycleNodeSettings:
        method: "Wait|Drain"
        concurrency: 5
        labelsToRemove:
            - <labelKey>
        ignorePodsLabels:
            labelName:
                - "value1"
                - "value2"
        ignoreNamespaces:
            - "kube-system"
    nodeName: <node name>
```

As seen in this specification, the cycleSettings are copied from the CNR specification and instructs the CNS on how to remove the pods on the node. The nodeName field indicates the name of the node to be terminated and is filled when the CNS is being created.

In some embodiments, the cycling manager 106 includes a number of programmable timers to perform its functions. This section describes these programmable timers. Generally speaking, these timers are started when corresponding actions are initiated and end at the end of a predefined time period. These timers include a watch timer, a buffer timer, and a wait timer.

The watch timer may be utilized by the monitoring module 112 to wait a predetermined period of time before checking if any outdated nodes exist in one or more node groups managed by the cycling manager 106. The watch timer may be initiated, e.g., once the monitoring module 112 has determined that no outdated nodes exist in any of the node groups it is monitoring, or after the monitoring module 112 has generated one or more CNR objects and ends after a predefined period of time.

Typically, compute resources are not updated very frequently. Therefore, actively or constantly monitoring for outdated nodes may be unnecessary and also an inefficient usage of network bandwidth and therefore the watch timer period may be set for a slightly long default duration such as 30 minutes, 1 hour, 2 hours, etc.

A buffer timer is also used by the monitoring module 112 in some embodiments. Typically, when a configuration change occurs in one system it takes a finite amount of time for that change to settle in the system. For example, if a node is added in a Kubernetes cluster, it takes finite amount of time for that node addition event to be detected and for the orchestration system to communicate this change to the resource provider and for the resource provider to update its system to reflect this. The buffer timer may be initiated once an outdated node is detected and may end at the end of the predefined period of time. During this buffer period, the monitoring module 112 waits for the changes in the environment 100 to settle.

Once the buffer period ends, the cycling manager 106 may be configured to initiate the cycling process.

As noted previously, in some embodiments, before terminating nodes, the cycling manager 106 may mark the outdated nodes as 'unschedulable'. To this end, the cycling manager 106 requests the master node 206 to update the properties of the outdated nodes to indicate that these nodes are unschedulable. This prevents the orchestration system 104 from assigning any new jobs to the marked nodes and can also allow any jobs that are active on the marked nodes to terminate before the nodes are permanently deleted.

When the outdated nodes are marked and the wait termination method is employed, the cycling module 114 initiates a wait timer. This wait timer is usually set for a predefined period of time that is sufficient for any jobs assigned to the node to finish and for any active pods on the node to naturally exit the node. During the pendency of the wait timer, the cycling module 114 may determine if the node is processing any active jobs. If no active pods/jobs exist on the node, the cycling module 114 can proceed to drain the node/delete the node. Alternatively, if the pods/jobs are not completed by the time the wait timer expires, the cycling module 114 ends the cycling process. The wait timer can be set for 5 minutes in one example.

A cycle lock is a mechanism that is used to ensure that any previously attempted cycling processes have been successfully completed before additional cycling processes can be initiated. This helps prevent the system from commencing any new cycling processes until the previous cycling processes have successfully ended. Further, if a previously initiated process has been interrupted because of a failure, the cycle lock prevents the cycling manager 106 from retrying until the error has been reviewed by an administrator.

The cycle lock can be applied when a cycling process is initiated. In some embodiments, once the cycling process is successfully completed, the scale lock can be removed.

It will be appreciated that the timers may be set and configured using any known computational techniques. For instance, the timers may be maintained by storing an expiry/timeout time. In case of the node marking timer, for example, the expiry time may be stored along with the properties/metadata associated with the node in the master node 206 or agent 208. The current time can be compared with the expiry time to determine whether the timer has expired or not.

This section describes methods and processes for cycling compute resources based on demand. Generally speaking, FIGS. 3 and 4 describe example methods for initiating a cycling process and FIGS. 5 and 6 describe example cycling processes according to some embodiments. As noted previously, some non-limiting implementation details of the methods will be described with reference to Kubernetes as the orchestration system 104. Further, methods are described with respect to a node group. However, it will be appreciated that at any given time the cycling manager 106 may be configured to manage multiple node groups for one or more resource requesting systems and that it may be configured to monitor these multiple node groups for outdated nodes. The methods described in this section are repeated for each of the node groups 204 managed by the cycling manager 106.

Method 300 begins at step 302, where the cycling manager 106 and in particular the monitoring module 112 determines the state of nodes in a node group the cycling manager 106 is configured to automatically update.

To this end, the monitoring module 112 may query the resource provider 102 to retrieve the current launch configuration version of the managed compute group and the launch configuration versions of the active compute resources in that compute group. In one example, the monitoring module 112 checks the version tag on the Launch Configuration Template, which is a value set by the service provider when creating and updating the node group and checks the launch templates of the nodes in the node group.

The monitoring module 112 may also query the DaemonSet controller in the master node 206 to determine the status of the nodes. In one example, the monitoring module 112 may query the API server 216 to retrieve the status of the total number of nodes that are running updated DaemonSet pods (e.g., using the command Status.UpdatedNumberScheduled) and the total number of nodes in the node group. The total number of nodes in the node group may be determined by determining the total number of nodes that are running at least one DaemonSet pod and are supposed to run the DaemonSet pod (e.g., using the command Status.currentNumberScheduled). In another example, the DaemonSet controller maintains ControllerRevision objects that indicate immutable snapshots of the DaemonSet controller's state. The corresponding pods have a label (controller-revision-hash) which references the controllerRevision that the pod is currently using. In this case, the monitoring module 112 queries the API server 216 to retrieves the latest ControllerRevision version number and compares this with the corresponding controllerRevision version of the pods.

In some embodiments, the monitoring module 112 directly queries the resource provider 102 and orchestration system 104. In other embodiments, the resource provider 102 and orchestration system 104 may publish the current launch configuration version and the launch configuration values of the active nodes in the node group to an intermediary service. Similarly, the orchestration system 104 may publish the number of nodes in the node group and the number of nodes in the node group that are running on an updated DameonSet template to the intermediary service. The monitoring module 112 may query this intermediary service to retrieve this information.

Next at step 303, the monitoring module 112 determines if any outdated nodes exist in the node group 204. In one example, the monitoring module 112 determines that outdated nodes exist in the node group if the launch configuration version of the compute group does not match the launch configuration versions of the active compute resources in that compute group. Alternatively, a determination is made that no outdated nodes exist in the node group if the launch configuration version of the compute group matches the launch configuration versions of the active compute resources in that compute group.

In another example, the monitoring module 112 determines that there are no outdated nodes in the node group if the number of nodes that are running updated DaemonSet pods is equal to the total number of nodes in the node group or if the controllerRevision versions of the DaemonSet controller matches the controllerRevision versions of the DaemonSet pods. Alternatively, if the number of nodes that are running updated DaemonSet pods is not equal to the total number of nodes in the node group or if the controllerRevision versions of the DaemonSet controller does not match the controllerRevision versions of the active DaemonSet pods, the monitoring module 112 determines that there are outdated nodes in the node group to be updated.

If at step 303 the monitoring module 112 determines that there are outdated nodes in the node group, the method proceeds to step 304, where the monitoring module 112 identifies the number of outdated nodes in the node group and retrieves their unique identifiers and starts the buffer timer.

As discussed previously, the buffer timer is utilized to wait for any changes in the environment 100 to settle. There are two main reasons for this. First, the watch timer is typically set for long duration. If a launch configuration or configuration template is updated and a number of compute resources/nodes are added to a node group in quick succession, the monitoring module 112 may detect the first compute node being added to the node group and determine that the remaining nodes in the compute group are outdated and initiate the cycling process. However, a number of other nodes may be added to the node group in quick succession after the first node and the cycling manager 106 has to wait for the duration of the watch timer before these changes can be detected. Second, any changes made to the underlying resources by the resource provider 102 may take a finite amount of time to be reflected in the orchestration system 104 and consequently for the orchestration system to update the node group based on those changes. Further, the resource provider and/or orchestration system may be configured to perform some follow up actions when a resource is added to the node group (e.g., deleting another node, updating its scheduling queue, etc.) which may again take a finite amount of time to be percolated to the other systems in the environment 100. For example, consider the situation where a node group has 10 nodes. A new node is added to this node group based on a new launch configuration. In this case, the previously existing 10 nodes in the node group become outdated. However, the resource provider may delete one of the older node when it adds the new node. This changes the number of outdated nodes in the group to 9. The buffer timer allows these changes to be settled.

Next, at step 306, the monitoring module 112 determines if the buffer timer has expired. If at this step it is determined that the buffer timer has expired, the method proceeds to step

308 where the monitoring module 112 determines if any cycling process is ongoing for the node group.

In one embodiment, this determination may be made by checking if a cycling lock is in place for the managed node group. If a cycling lock is active, the monitoring module 112 determines that a previous cycling process is still ongoing. In another embodiment, this determination may be made by checking the state of the most recent/currently active CNR objects in the node group. In one example, this may be done by performing a GET function to retrieve the status of any CNR objects. This will show the current status of the CNR objects in a table. Table D illustrates an example output—

TABLE D

| | example CNR status | | | | |
|---|---|---|---|---|---|
| Name | Node Group Name | Method | Concurrency | Status | Age |
| My-cnr | Example.my-nodes.my-site.com | Drain | 1 | Successful | 20m |

In this example, the status of the latest CNR object executed against the "example.my-nodes.my-site.com" is successful—indicating that the latest CNR has been successfully completed. In other examples, the status may be "failed", "scaling up" etc.—indicating that the latest CNR object is still ongoing.

Using any of the above techniques, if at step 308 it is determined that there are no ongoing cycling processes for the node group, the method proceeds to step 310 where the monitoring module 112 generates a CNR object and applies this generated CNR object to the node group. As described previously, in some embodiments, this involves retrieving the node request object and using this as a template to generate the CNR object. In one example, the CNR object may be in the form of the CNR shown in table B and includes a list of the outdated nodes in the group.

The monitoring module 112 may also be configured to set the cycle lock once the CNR object is generated and applied to the corresponding node group.

Alternatively, if at step 308 it is determined that an ongoing cycling process is identified for the node group, the method proceeds to step 312 where a watch timer is initiated. The method can also proceeds to step 312 from step 303, if a determination is made at step 302 that no outdated nodes exist in the node group. Once the watch timer is set, the monitoring module 112 determines if the watch timer has expired at step 314. If the watch timer has not expired, the monitoring module 112 continues to wait for the timer to expire. Alternatively, once the watch timer expires, the method once again proceeds to step 302 and method 300 repeats.

Returning to step 306, if at this step it is determined that the buffer timer has not expired, the monitoring module 112 backs off for a predetermined period of time and checks again and repeats this until it determines that the buffer timer has expired.

In the example method 300 described above, the monitoring module 112 executes on a configurable timed loop for checking outdated nodes. Because of this timed loop nature of the method, it can be rescheduled at any state and still identify new changes in the state of outdated nodes in a node group once the watch timer expires. Further, if a change is inadvertently dropped or not identified until the buffer timer expires, the change will automatically be detected in the next watch cycle (i.e., once the watch timer expires).

However, there might also be some drawbacks of this method. The duration of the timed loop depends on the time duration of the watch timer. The longer this duration, the longer the monitoring module 112 waits before rechecking if any outdated nodes exist in a managed node group. Therefore, in this method, if a change occurs immediately after the buffer timer ends, that change is detected in the next cycle (i.e., after the watch timer expires). Therefore in this method, in the worst case scenario, a delay equivalent to the watch timer duration may be experienced before a change results in a cycling process being initiated.

Figure 4:
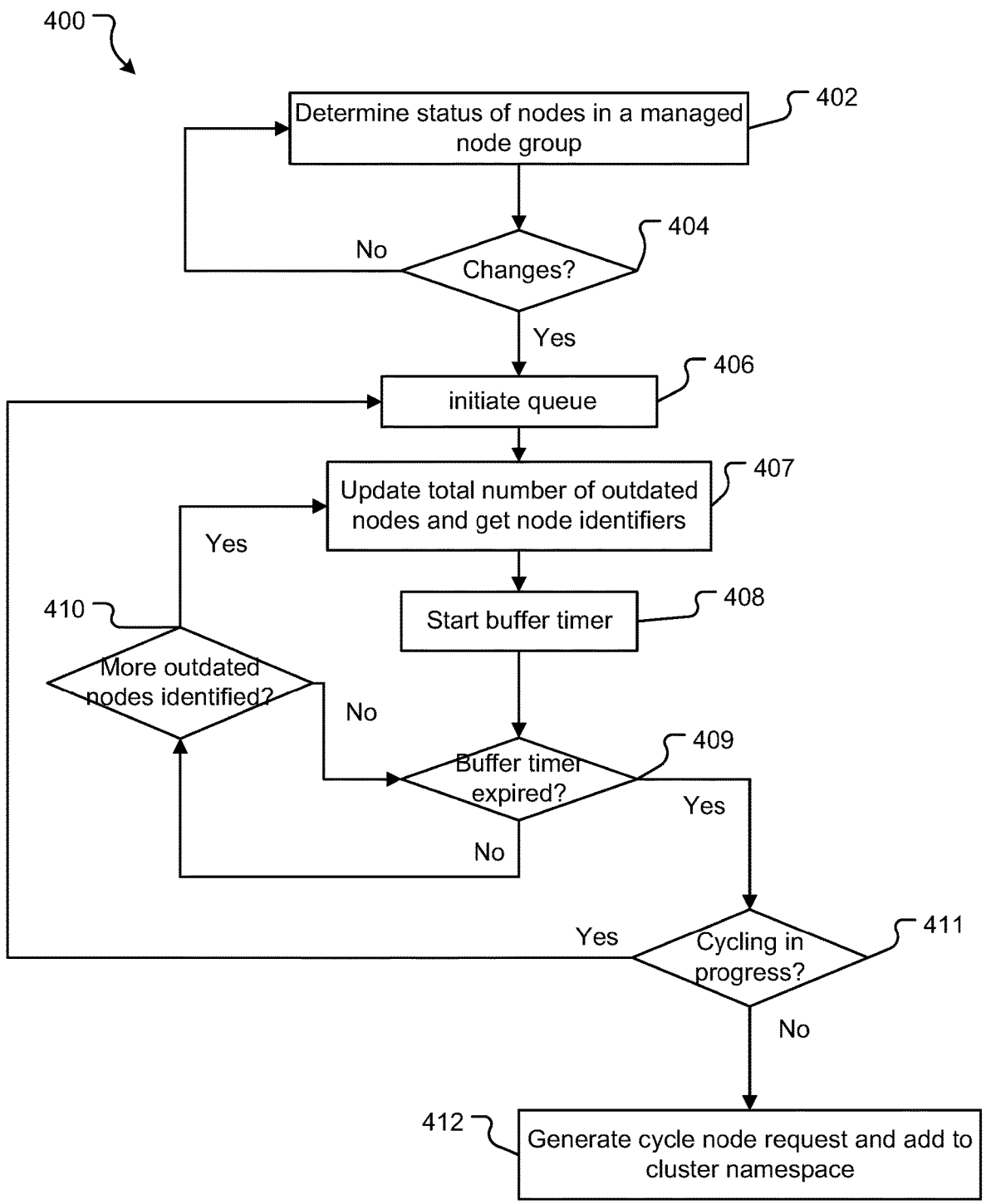
FIG. 4 is a flowchart illustrating an alternate method for initiating a cycling process according to some embodiments of the present disclosure.

FIG. 4 illustrates an alternate method for initiating a cycling process according to some embodiments of the present disclosure. In this method 400, a frequent watch or poll looks for outdated nodes. If any outdated nodes are identified, the monitoring module 112 initiates a queue with a timer that resets whenever a new change is detected in the number of identified outdated nodes by the monitoring module 112. Once the timer expires, the monitoring module 112 performs steps similar to those described with reference to FIG. 3.

Method 400 begins at step 402, where the monitoring module 112 checks the status of the node group. That is, the monitoring module 112 checks the status of the current launch configuration for the node group available at the resource provider 102, the current launch template for the node group available at the orchestration system 104, the launch configurations of the active nodes in the node group available at the resource provider 102 and the launch templates of the DaemonSet pods in the node group available at the orchestration system 104.

At step 404, the monitoring module 112 determines if there is any variance in the current launch configuration or configuration template for the node group and the launch configuration or configuration template of the active nodes in the node group.

If no changes are detected at step 404, the monitoring module 112 determines that no outdated nodes exist in the node group and the method reverts to step 402.

Alternatively, if any changes are detected at step 404, the monitoring module 112 determines that one or more outdated nodes exist in the node group and the method proceeds to step 406 where a queue is initiated. At step 407, the monitoring module 112 retrieves the total number of outdated nodes in the group and the unique identifiers of these nodes from the intermediary service or directly from the resource provider 102 and/or orchestration system 104. These are added to the initiated queue.

At step 408, a buffer timer is started. During the pendency of the buffer timer, the monitoring module 112 checks if any further changes can be detected in the number of outdated nodes. If further changes are detected, the queue is updated and the buffer timer is restarted. That is, each time a new change is detected and the queue is updated, the buffer timer is restarted. The monitoring module 112 remains in this state until no further changes are detected and the buffer timer expires.

This is illustrated by steps 409 and 410. In particular, at step 409, a determination is made whether the buffer timer has expired. If the buffer times has not expired, at step 410 the monitoring module 112 determines if any more changes to the number of outdated nodes are identified. If changes are identified, the method reverts to step 407, where the total number of outdated nodes is updated and the monitoring module updates the node identifiers of the outdated nodes. Thereafter the buffer timer is started again (at step 408). This cycle continues until the buffer timer expires without detection of any new changes.

Once the buffer timer expires, the method proceeds to step 411 where the monitoring module 112 determines whether any cycling process is currently ongoing for the node group. This step is similar to step 308 of method 300 and therefore is not described in detail here again.

If at step 411 it is determined that a cycling process is currently ongoing, the method reverts to step 406 where the queue is reinstated.

Alternatively, if it is determined that there are no ongoing cycling processes for the node group, the method proceeds to step 412 where the monitoring module 112 generates a CNR object and applies this to the corresponding node group. This step is also similar to step 310 of method 300 and therefore not described in detail.

When the CNR object is applied to the node group, the API server 216 validates the CNR object before adding it as an object in the node group. To this end, the API server 216 determines whether the CNR object includes the appropriate fields for cycling outdated nodes (such as node group name and selector) and that the fields are in the correct format and types. Once the CNR passes this validation, it is added as an object to the node group.

As the monitoring module 112 repeatedly checks for changes in this method, there is less delay between detecting changes and initiating the cycling process. Further, similar to method 300, method 400 can be rescheduled at any state and would still be able to identify new changes in the state of outdated nodes in a node group.

Figure 5:
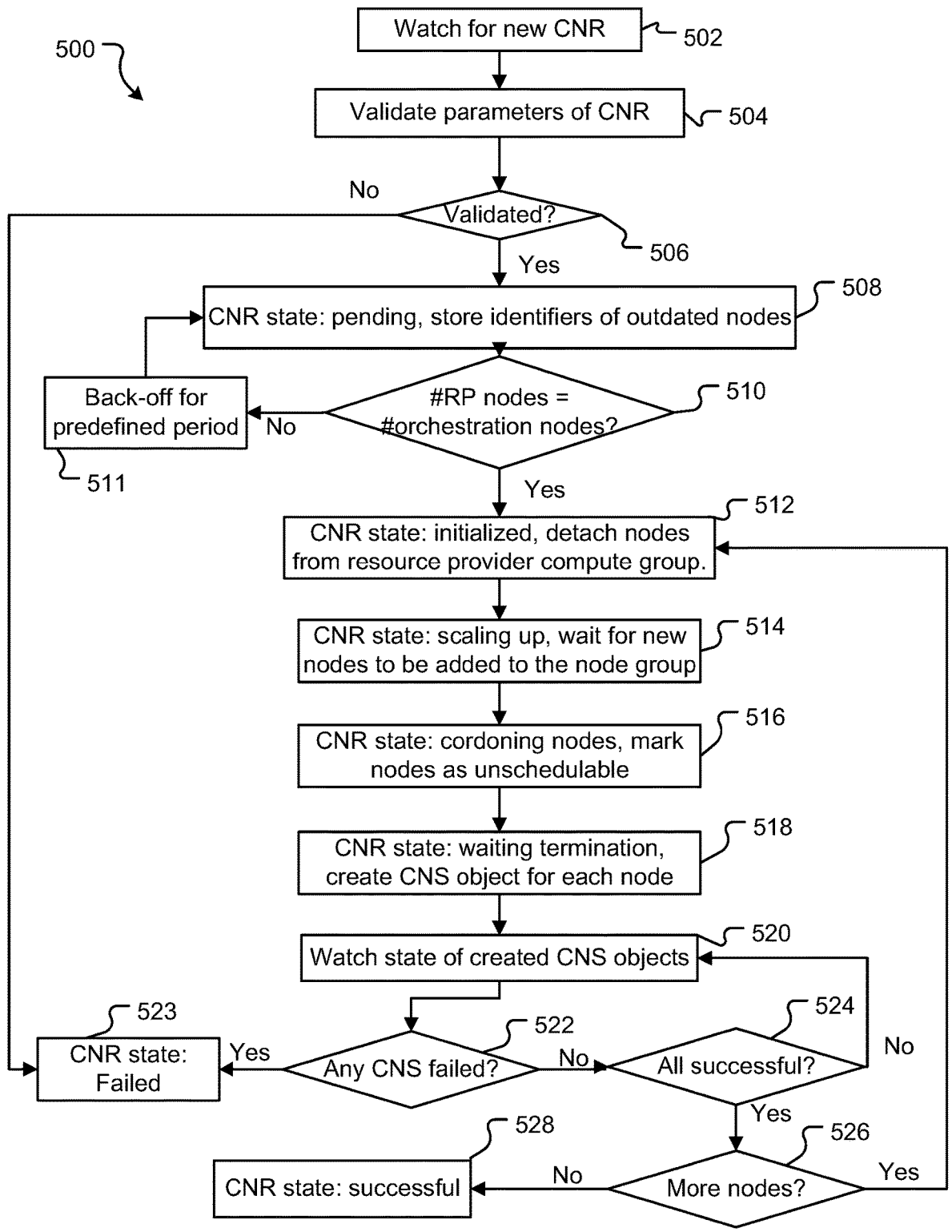
FIG. 5 is a flowchart illustrating an example cycling process according to some embodiments of the present disclosure.

FIG. 5 illustrates an example process for cycling outdated nodes once the monitoring module 112 detects one or more outdated nodes, generates a CNR object and applies it to the corresponding node group. As described previously, the cycling process functions as a state machine, transitioning from one state to a different state once certain criteria is satisfied for a particular state.

Method 500 commences at step 502, where the cycling module 114 checks for a new CNR object in the node group it is managing. In one example, the cycling module 114 may setup a watch for the CNR object and request the master node 206 (and in particular the API server 216) to communicate with the cycling module 114 whenever the master node 206 identifies a newly created CNR object in the node group in which it is running.

Once a new CNR object is identified, the method 500 proceeds to step 504, where the cycling module 114 validates the parameters of the CNR object. In particular, it checks whether the CNR includes the fields required to perform the cycling process—such as selector field for selecting nodes.

At step 506, a determination is made whether the parameters are valid. If the parameters are invalid, the cycling module 114 may generate an error message and end the method 500.

Alternatively, if a determination is made that the parameters of the CNR are valid, the cycling module 114 updates the state of the CNR object to "pending" at step 508. The cycling module 114 also stores the unique identifiers of the outdated nodes that need to be cycled in database 116. In one example, the identifiers of the outdated nodes are stored under the "status" of the CNR. Table E illustrates an example of the CNR status fields at this stage, showing the current state, the time at which the state commenced, a message (which is typically empty at this stage unless an error has occurred), and a list of the outdated nodes that need to be terminated.

TABLE E example status at the pending stage

| State | Time started | Message | nodesToTerminate |
|---|---|---|---|
| Pending | 2020-05-11T00:01:47Z | "" | node-ip-xxx.my-site.com  node-ip-yyy.my-site.com |

Next (at step 510), the cycling module 114 determines whether the number of nodes maintained by the orchestration system 104 are equal to the number of nodes maintained by the resource provider 102. This check is performed to allow any scaling up or scaling down operation performed by the resource provider 102 just before the cycling method 500 commences to be reflected in the orchestration system 104 and in particular in the number of nodes maintained by the master node 206.

To make this determination, the cycling module 114 retrieves the name of the node group maintained by the resource provider 102 corresponding to the node group maintained by the orchestration system 104. In one example, this may be retrieved by providing the command "describe-nodegroup" (where the command includes the unique identifier of the managed node group maintained by the orchestration system 104) and requesting the name of the resource provider nodegroup corresponding to the nodegroup maintained by the orchestration system. Alternatively, the CNR object includes the name of the group maintained by the resource provider 102 that corresponds to the node group managed by the orchestration system. In this case, the cycling module 114 may simply retrieve this from the CNR object. Subsequently, the cycling module 114 requests the resource provider 102 to provide the number of active nodes in the node group maintained by the resource provider 102. The cycling module 114 also retrieves the number of active nodes in the node group maintained by the orchestration system 104 (e.g., by communicating with the master node 206).

Once these values are retrieved, the cycling module 114 compares the number of active nodes maintained by the two systems for the corresponding node group. If the number of active nodes do not match, the method proceeds to step 511 where the cycling module 114 backs-off for a predefined period of time and performs this determination again.

Alternatively, if the number of active nodes maintained by the two systems match, the cycling module 114 transitions the CNR object to the "initialized" state at step 512. In the initialized state, the cycling module 114 detaches one or more compute nodes from the resource provider node group. This essentially removes one or more resources from the resource provider node group. In one example, the cycling module 114 passes name of the resource provide node group and the identifiers of the one or more compute nodes to detach. Further, it does not specify the option to decrement the capacity of the node group, which triggers the resource provider 102 to add replacement nodes for the one or more detached nodes. Detaching the resource provider compute nodes allows the resource provider to add new compute nodes in the resource provider node group without deleting the corresponding nodes from the Kubernetes node group. The detached nodes are still running and exist, but are not counted toward the total resource provider node group count. Once the resource provider 102 assigns the replacement nodes to the node group, it informs the orchestration system 104 that additional compute resources are added, which updates its list of nodes 202 for that node group 204 to include the newly added nodes 202.

The number of nodes that the cycling module 114 detaches is based on the number of outdated nodes identified in this particular watch cycle and the maximum number of nodes the resource requesting system 110 had specified in the node group object that can be cycled concurrently. For example, if the number of outdated nodes identified in this particular watch cycle (e.g., 10 identified outdated nodes) is equal to or exceeds the maximum number of nodes the cycling module is allowed to concurrently update (e.g., 3 nodes), the cycling module 114 detaches the maximum number of nodes specified in the node group object (e.g., 3 nodes). Alternatively, if the number of outdated nodes identified in this particular watch cycle (e.g., 2 outdated nodes) is less than the maximum number of nodes the cycling module 114 is allowed to concurrently update (e.g., 3 nodes), it detaches the identified outdated nodes (e.g., 2 nodes).

To do this, the cycling module 114 retrieves the list of outdated nodes stored in the database 116 at step 508, retrieves the unique identifiers of the number of nodes it has decided to detach, and provides these to the master node 206 along with a command to detach them. The cycling module 114 also updates the list of outdated nodes in table E to mark the selected nodes are "detached".

Once the cycling module 114 detaches the one or more nodes from the node group, it transitions the CNR object to the "scaling up" state at step 514. In this state, the cycling module 114 waits for the resource provider 102 to bring up the new nodes and waits for the new nodes to be reflected in the orchestration system 104 in a ready state.

In certain embodiments, the cycling module 114 may query the API server 216 of the master node to receive the status of the running nodes in the node group. For example, in Kubernetes, the cycling module 114 may fetch the status of the nodes 202 in a node group 204 using a Kubernetes API call (via Kubernetes REST interface) such as 'GET NODES'. In another example, the cycling module 114 may fetch a list of newly created nodes along with their status via the 'watch' function and may store this in the database 116 in the cycling manager 106. The status typically includes the condition of corresponding node in the node group—ready, unhealthy, unresponsive.

The cycling module 114 reviews this list of nodes and determines the number of new nodes created in the node group and their corresponding condition. If the number of new nodes matches the number of nodes detached by the cycling module 114 and if the condition of these nodes is "ready", the cycling module 114 determines that the node group has been scaled up. Alternatively, if either the number of new nodes does not match the number of nodes detached by the cycling module in step 512 or the condition of the nodes is not ready, the cycling module 114 determines that the node group has not scaled up and continues to wait for these conditions to be met.

Once it is determined that the resource provider 102 has scaled up and the orchestration system 104 reflects this scale up, the cycling module 114 updates the state of the CNR to "cordoning node" at step 516. While the object is in the cordoning node state, the cycling module 114 marks the selected nodes as unschedulable. Marking a node as unschedulable prevents new pods from being scheduled to that node, but does not affect any existing pods on the node. In Kubernetes, nodes can be marked as unschedulable by running the command—kubectl cordon $NODENAME. The cycling module 114 cordons the same number of nodes as were added by the resource provider 102 at step 514. Further, the cycling module 114 retrieves the unique identifiers of the nodes to be cordoned from the list of outdated nodes stored in the database 116 at step 508 and updates the status of the detached nodes to "cordoned" in the database 116.

Once the cycling module 114 determines that the selected nodes have been marked as unschedulable, the method proceeds to step 518 where the cycling module 114 transitions the CNR to "Waiting Termination". In the "Waiting Termination" state, the cycling module 114 creates CNS objects for the nodes that were marked unschedulable at step 516. For example, if three nodes were marked as unschedulable, the cycling module 114 generates three CNS objects—one for each unschedulable node. Each of these CNS objects handles the termination of an individual node. Further, the specification of each of these objects indicates the unique identifier of the node that particular object is supposed to terminate and the termination method for the particular node—waiting method or draining method. In one embodiment, the CNS has a format similar to that described with reference to Table C.

At step 520, the cycling module 114 watches the status of the CNS objects created at step 518 and waits for the status of these CNS objects to enter the "Successful" or "Failed" state. Again, this may be done by actively and periodically requesting the master node 206 for a status of the CNS objects or applying a watch so that the master node 206 forwards an update on the CNS objects each time the state of any CNS object changes.

If at step 522, the cycling module 114 determines that any of the CNS objects has failed, the cycling module updates the state of the CNR object to "Failed" at step 523 and does not add any more nodes for cycling and the method 500 ends.

If the state of none of the CNS objects is failed, the cycling module 114 waits for the CNS objects to return a successful state within a predefined duration at step 524. If it is determined that the CNS objects have returned a successful state, the cycling module 114 updates the status of the nodes marked as cordoned to "successfully updated/deleted" in table E and checks the list of outdated nodes to determine if any further nodes remain in the list to be updated at step 526.

If any further nodes remain in the list that need to be updated in this cycle, the method repeats from step 512. Alternatively, if no further nodes remain in the list that have not already been updated/deleted, the cycling module 114 updates the state of the CNR to "successful" at step 528 and the method 500 ends.

Figure 6:
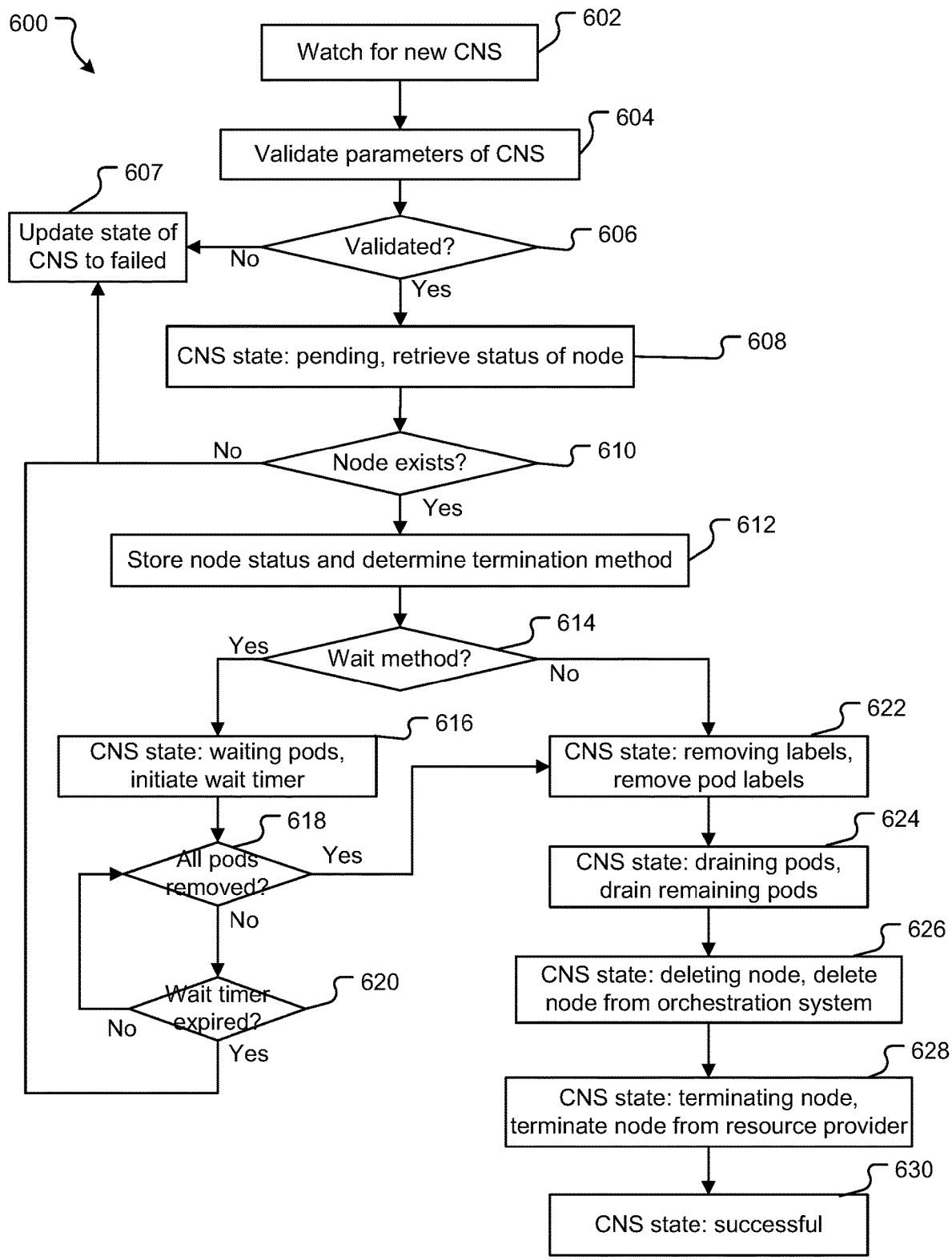
FIG. 6 is a flowchart illustrating an example process for terminating a node according to some embodiments of the present disclosure.

FIG. 6 illustrates an example method performed by the cycling module 114 in response to a particular CNS object being created and applied to the node group. In particular, this method illustrates the process for draining pods from, and termination of, an individual node. It will be appreciated that a method similar to that described with reference to FIG. 6 is performed by the cycling module 114 for each of the CNS objects generated by the cycling module 114 at step 518 of method 500 to terminate each of the nodes marked as unschedulable at step 516 of method 500.

Method 600 commences at step 602, where the cycling module 114 checks for a new CNS object in the node group in which the node group exists. In one example, the cycling module 114 may setup a watch for the CNS object and request the master node 206 to communicate with the cycling module 114 whenever the master node 206 identifies a newly created CNS object in the node group in which the master node is running.

Once a new CNS object is identified, the method 600 proceeds to step 604, where the cycling module 114 validates the parameters of the CNS object. For example, it checks whether the cycling parameters (such as deleting method) are present in the CNS object.

At step 606, a determination is made whether the parameters are valid. If the parameters are invalid, the cycling module 114 updates the state of the CNS object to "failed" at step 607 and ends method 600.

Alternatively, if a determination is made that the parameters of the CNS object are valid, the cycling module 114 updates the state of the CNS object to "pending" at step 608. In the pending state, the cycling module 114 retrieves the status of the node it is supposed to terminate. To this end, the cycling module 114 may submit a Get command (such as GET /api/v1/nodes/{name}) to the API server 216 to receive the status of the node. The API server returns a status of the node, which may be "ready" indicating that the node is working as expected or "not ready" indicating that something may be wrong with the node.

Next, at step 610, a determination is made if the node still exists (e.g., if the received status of the node is "Ready"). If the node does not exist (e.g., because the status of the node is "notReady"), the cycling module 114 updates the state of the CNS object to failed (at step 607) and the method 600 ends.

Alternatively, if at step 610, it is determined that the node exists, the status of the node is stored in the database 116 and the cycling module 114 determines the termination method for the selected node—e.g., by performing a lookup of the termination method in the CNS specification.

If the selected termination is determined to be the wait method (at step 612), the cycling module 114 updates the state of the CNS object to "waiting pods" at step 614 and begins a wait timer having a predefined duration.

In the "waiting pods" state, the cycling module 114 waits for the pods to complete any currently ongoing tasks and periodically monitors the state of the node to determine if any active pods are currently executing any tasks. Once a pod completes its task, the pod's status typically changes from running to waiting. If no further tasks are scheduled to the node, the pods that have completed their tasks are removed. Accordingly, in one example, the cycling module 114 periodically requests the API server 216 to provide a list of the pods running on the selected node. If the list includes one or more pods, the cycling module backs-off for a predefined period and requests the list of pod again (as long as the wait time has not expired). Alternatively, if the API server 216 returns an empty list, the cycling module 114 determines that the tasks have been completed by the node.

If any pods still remain on the node after the wait timer has expired, the method proceeds to step 607 where the cycling module 114 updates the state of the CNS object to "failed" and the method 600 ends. Alternatively, if the pods are removed from the node before the wait timer expires, the method 600 proceeds to step 622 where the cycling module 114 updates the status of the CNS object to "Removing Labels".

In some cases, nodes may be running certain pods that do not exit themselves. In such cases, the resource requesting system 110 can configure the node group specification for the wait termination methods to include a list of pods to be ignored in the wait termination method. Accordingly, at step 616, the cycling module 114 may also check the CNS specification to determine if an ignore parameter is present that specifies any pods to be ignored during the termination process. If any such pod labels are identified, the cycling module 114 ignores these pods when determining whether the pods have exited the node.

Alternatively, if the terminating method is determined to be the draining method at step 612, the cycling module 114 updates the status of the CNS object to "removing labels" at step 616.

In the "removing labels" state, the cycling module 114 removes any labels that are defined in the 'labelsToRemove' field in the CNS from any pod that is running on the target node. This is useful when "detaching" a pod from a service is required before draining it from a node to prevent requests in progress to the pod from being interrupted.

Once the labels have been removed, the cycling module 114 updates the state of the CNS object to "draining pods. In the "draining pods" state, the cycling module 114 requests the master node 206 to drain (i.e., evict or delete) any remaining pods from the target nodes. Because pods represent running processes on nodes, it is sometimes important to allow those processes to gracefully terminate when they are no longer needed. When the cycling module 114 requests the master node 206 to delete the remaining pods on the node, the master node 206 records the intended grace period (typically a default period of 30 s) before the pod is allowed to be forcefully killed, and a TERM signal is sent to the main process in each pod container. Once the grace period has expired, a KILL signal is sent to those processes, and the pod is then deleted from the API server.

Once the remaining pods on the node are drained in this manner, the method proceeds to step 626, where the cycling module 114 updates the state of the CNS object to "deleting node. While the object is in this state, the cycling module 114 requests the API server 216 to delete the node.

Once the node has been deleted, the method proceeds to step 628, where the cycling module 114 updates the state of the CNS object to "terminating node". While the object is in this state, the cycling module 114 requests the resource provider 102 to terminate the resources assigned to that node. In certain embodiments, this may be done by generating and sending a terminate command to the resource provider to terminate/release the physical/virtual machines assigned to this node from the corresponding compute group.

Once the physical/virtual machines assigned to the node have been terminated, the cycling module 114 updates the state of the CNS object to "Successful" and the method 600 ends.

FIGS. 5 and 6 depict a number of states in which a CNR or a CNS object may fail to transition from a given state to the next state. In these instances, the CNR or the CNS object is instead updated to have a failed state. However, it will be appreciated that methods 500 and 600 may fail at a lot more or different stages than depicted in FIGS. 5 and 6. Typically these failures may occur because the conditions for transitioning the CNR or the CNS object from one state to the next could not be achieved in a given time duration. In such cases, where the CNR or CNS object is stuck in a state longer than a predetermined time period, the cycling module may change the state of the CNR or the CNS to "failed" and end the processes.

Whenever method 500 or 600 does not successfully complete, the cycling manager 106 may raise an alert and notify an administrator at the resource requesting system 110. The administrator may review the nature of the error and manually fix it or restart the cycling process to retry.

The operations/techniques described herein are implemented by one or more computing systems or devices. For example, in environment 100: the resources provided by the resource provider may be one or more computer systems; the orchestration system 104 may be provided by one or more computer systems; the resource requesting systems 110 may be provided by one or more computer systems; and the cycling manager 106 may be executed on a computer system.

The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The computing devices may be desktop computer systems, portable computer systems, handheld devices, networking devices or any other device that incorporates hard-wired and/or program logic to implement relevant operations.

Figure 7:
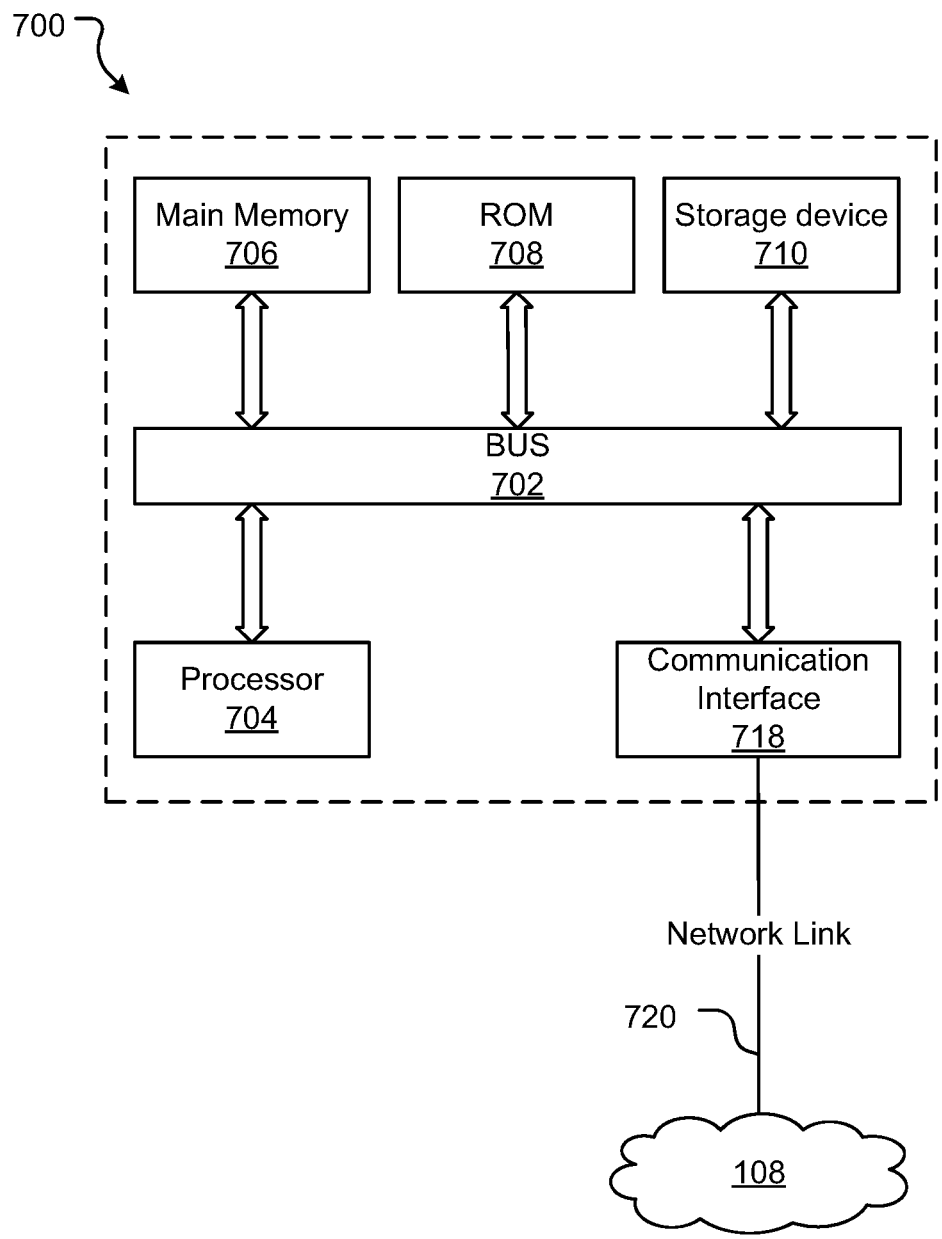
FIG. 7 is a block diagram of an example computer system on which some aspects of the present disclosure can be implemented.

For example, FIG. 7 is a block diagram that illustrates a computer system 700 upon which an embodiment of the present disclosure may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

According to one embodiment, the methods disclosed herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to network 108. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks 108 to other computing systems. For example, if the computing system 700 is part of the physical machines assigned to a resource requesting system 110, the network link 720 may provide a connection through network 108 to the orchestration system 104 or the resource provider 102.

Computer system 700 can send messages and receive data, including program code, through the network(s), network link 720 and communication interface 718. In the resource provider example, a computer system 700 may receive requests for launching containers from the orchestration system 104 through the network 108 and communication interface 718.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for automatically cycling outdated compute nodes in a compute group maintained by an orchestration system in communication with a resource provider, the method comprising:
   (a) detecting a new cycle node request (CNR) object in the compute group, the CNR object including identifiers of one or more outdated compute nodes and an identifier of a method for deleting the one or more outdated compute nodes;
   (b) causing the resource provider to add one or more new compute resources to a resource group maintained by the resource provider that corresponds to the compute group maintained by the orchestration system;
   (c) causing the orchestration system to cordon the one or more outdated compute nodes;
   (d) generating a cycle node status (CNS) object for each of the one or more outdated compute nodes, each CNS object including an identifier of a corresponding outdated compute node and the identifier of the method for deleting the outdated compute node;
   (e) for each CNS object:
      (i) deleting the corresponding outdated compute node based on the method for deleting the outdated compute node specified in the CNS object,
      (ii) causing the resource provider to terminate a corresponding compute resource in the corresponding resource group; and
      (iii) updating a state of the CNS object to successful upon successfully causing the resource provider to terminate the corresponding compute resource;
   (f) monitoring the state of the CNS objects; and
   (g) ending the method for automatically cycling the outdated compute nodes upon determining that the state of each of the CNS objects is successful.

2. The computer-implemented method of claim 1, further comprising initializing a state machine based on the CNR object in response to detecting the new CNR object, wherein the state machine is configured to perform steps (a)-(g).

3. The computer-implemented method of claim 2, wherein the state machine is further configured to initialize a child state machine for each of the CNS objects, wherein each child state machine is configured to perform the steps (i)-(iii).

4. The computer-implemented method of claim 1, further comprising:
   determining whether a number of compute nodes in the compute group maintained by the orchestration system match a number of compute resources in the resource group maintained by the resource provider; and
   upon determining that the number of compute nodes in the compute group match the number of compute resources in the resource group maintained by the resource provider, causing the resource provider to add the one or more compute resources to the resource group maintained by the resource provider.

5. The computer-implemented method of claim 1, wherein causing the resource provider to add the one or more compute resources to the resource group includes causing the resource provider to first detach one or more outdated compute resources and then replace the detached outdated compute resources by adding the one or more new compute resources to the resource group.

6. The computer-implemented method of claim 1, wherein causing the resource provider to add the one or more compute resources to the resource group causes the orchestration system to add a corresponding number of compute nodes to the compute group.

7. The computer-implemented method of claim 1, wherein cordoning the one or more outdated compute nodes comprises marking the one or more outdated compute nodes as unschedulable so that no new tasks are scheduled to the one or more outdated compute nodes.

8. The computer-implemented method of claim 3, wherein the CNR further includes a parameter indicating a maximum number of compute nodes the state machine can concurrently update.

9. The computer-implemented method of claim 8, wherein a number of child state machines initialized by the state machine at one time does not exceed the maximum number of compute nodes the state machine can concurrently update.

10. The computer-implemented method of claim 9, wherein if a number of outdated compute nodes exceeds the maximum number of compute nodes the state machine can concurrently update, the state machine generates a first set of CNS objects equal to the maximum number of compute nodes the state machine can concurrently update and generates additional sets of CNS objects to cycle remaining outdated compute nodes once the state of the first set of CNS objects is successful.

11. The computer-implemented method of claim 3, wherein the method for deleting the outdated compute nodes is at least one of a drain method or a wait method, and wherein deleting the outdated compute node based on the drain method includes forcefully draining pods from the outdated compute node and wherein deleting the outdated compute node based on the wait method includes waiting for the pods on the node to complete executing their tasks.

12. The computer-implemented method of claim 11, wherein when the CNS includes the identifier of the wait method, the CNS includes an ignore parameter that defines one or more pod labels, and wherein when executing the wait method, the child state machine determines if any active pods on the compute node have the one or more pod labels defined in the ignore parameter and if the child state machine identifies any pods having the one or more labels, the child state machine does not wait for the identified pods to complete executing their tasks before proceeding to a next state.

13. A system for automatically cycling outdated compute nodes in a compute group maintained by an orchestration system in communication with a resource provider, the system comprising:

a cycling manager configured to:

detect a new cycle node request (CNR) object in the compute group, the CNR object including identifiers of one or more outdated compute nodes and an identifier of a method for deleting the one or more outdated compute nodes;

initialize a state machine based on the CNR object, the state machine configured to:

cause the resource provider to add one or more new compute resources to a resource group maintained by the resource provider that corresponds to the compute group maintained by the orchestration system;

cause the orchestration system to cordon the one or more outdated compute nodes;

generate a cycle node status (CNS) object for each of the one or more outdated compute nodes, each CNS object including an identifier of a corresponding outdated compute node and an identifier of a method for deleting the outdated compute node;

initialize a child state machine for each of the CNS objects, wherein each child state machine is configured to:

perform the method for deleting the outdated compute node specified in the CNS object, and cause the resource provider to terminate a corresponding compute resource in the corresponding resource group; and update a state of the CNS object to successful;

monitor the state of the CNS objects; and upon determining that the state of each of the CNS objects is successful, ending the state machine.

14. The system of claim 13, wherein causing the resource provider to add the one or more compute resources to the resource group includes causing the resource provider to first detach one or more outdated compute resources and then replace the detached outdated compute resources by adding the one or more new compute resources to the resource group.

15. The system of claim 13, wherein causing the resource provider to add the one or more compute resources to the resource group causes the orchestration system to add a corresponding number of new compute nodes to the compute group.

16. The system of claim 13, wherein the CNR further includes a parameter indicating a maximum number of compute nodes the state machine can concurrently update.

17. The system of claim 16, wherein a number of child state machines initialized by the state machine does not exceed the maximum number of compute nodes the state machine can concurrently update.

18. The system of claim 17, wherein if a number of outdated compute nodes exceeds the maximum number of compute nodes the state machine can concurrently update, the state machine generates a first set of CNS objects equal to the maximum number of compute nodes the state machine can concurrently update and generates additional sets of CNS objects to cycle remaining outdated compute nodes once the state of the first set of CNS objects is successful.

19. The system of claim 13, wherein the method for deleting the outdated compute nodes is at least one of a drain method or a wait method, wherein in the drain method each child state machine forcefully drains one or more pods from the outdated compute node and in wait method each child state machine waits for the one or more pods on the outdated compute node to complete executing tasks.

20. The system of claim 19, wherein when the CNS includes the identifier of the wait method, the CNS also includes an ignore parameter that defines one or more pod labels, and wherein when executing the wait method, the child state machine determines if any active pods on the outdated compute node have the one or more pod labels defined in the ignore parameter and if the child state machine identifies any pods having the one or more labels, the child state machine does not wait for the identified pods to complete executing their tasks before proceeding to a next state.

* * * * *